United States Patent
Linsky et al.

(10) Patent No.: US 9,743,449 B2
(45) Date of Patent: Aug. 22, 2017

(54) BLUETOOTH LOW ENERGY SECONDARY DATA CHANNEL WITH MULTI-RATE STREAMING

(71) Applicant: QUALCOMM Incorporated, San Diego, CA (US)

(72) Inventors: Joel Benjamin Linsky, San Diego, CA (US); Brian Arnold Redding, Urbana, IL (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 14/466,106

(22) Filed: Aug. 22, 2014

(65) Prior Publication Data

US 2015/0201446 A1   Jul. 16, 2015

Related U.S. Application Data

(60) Provisional application No. 61/926,994, filed on Jan. 14, 2014.

(51) Int. Cl.
| | |
|---|---|
| *H04L 12/28* | (2006.01) |
| *H04W 76/02* | (2009.01) |
| *H04W 88/06* | (2009.01) |
| *H04W 4/00* | (2009.01) |
| *H04B 1/713* | (2011.01) |

(Continued)

(52) U.S. Cl.
CPC .......... *H04W 76/025* (2013.01); *H04B 1/713* (2013.01); *H04L 9/00* (2013.01); *H04W 4/008* (2013.01); *H04W 12/06* (2013.01); *H04W 88/06* (2013.01); *H04W 84/18* (2013.01)

(58) Field of Classification Search
USPC ........ 370/252, 254, 255, 311, 329–331, 341, 370/345, 348, 431
See application file for complete search history.

(56) References Cited

U.S. PATENT DOCUMENTS

| | | |
|---|---|---|
| 6,920,171 B2 | 7/2005 | Souissi et al. |
| 8,612,595 B2 | 12/2013 | Zetterman et al. |

(Continued)

OTHER PUBLICATIONS

Anonymous: "Bluetooth Core Package Version 4.1", Bluetooth, Dec. 3, 2013 (Dec. 3, 2013), pp. 177 to 181-334 to 341, XP002739457, Retrieved from the Internet: URL: https://www.bluetooth.org/DocMan/handlers/DownloadDoc.ashx?doc_id=282159 [retrieved on May 11, 2015] paragraph [8.6.2]-paragraph [8.6.3] paragraph [4.6.2].

(Continued)

*Primary Examiner* — Yemane Mesfin
*Assistant Examiner* — Mon Cheri Davenport
(74) *Attorney, Agent, or Firm* — Muncy, Geissler, Olds & Lowe, P.C./QUALCOMM

(57) ABSTRACT

Packets are communicated between a first device and a second device, over a primary data channel, according to an interval. The first device receives over the primary data channel a request from the second device to establish a secondary data channel. The request includes secondary connection parameters including an offset relative to events on the primary data channel, and a sub-interval relative to the interval. Acknowledgement is exchanged and the first and second devices communicate over the secondary data channel according to the secondary connection parameters.

30 Claims, 5 Drawing Sheets

(51) Int. Cl.
*H04W 12/06* (2009.01)
*H04L 9/00* (2006.01)
*H04W 84/18* (2009.01)

(56) References Cited

U.S. PATENT DOCUMENTS

2010/0120362 A1    5/2010  Walley et al.
2011/0021142 A1*   1/2011  Desai .................... H04W 8/005
                                                           455/41.2
2013/0010960 A1*   1/2013  Ho ........................ H04L 9/0637
                                                           380/270
2013/0045684 A1*   2/2013  Linde .................... H04W 80/02
                                                           455/41.2

OTHER PUBLICATIONS

International Search Report and Written Opinion—PCT/US2015/010633—ISA/EPO—Jun. 1, 2015.
Zhang X., et al., "An energy efficient implementation of on-demand MAC protocol in medical Wireless Body Sensor Networks", IEEE International Symposium on Circuits and Systems, ISCAS 2009, Piscataway, NJ, USA, May 24, 2009 (May 24, 2009), pp. 3094-3097, XP031479899, ISBN: 978-1-4244-3827-3, Section III.
Mei J.M. et al., "Access Control Using Bluetooth TM09," The University of New South Wales School of Electrical Engineering and Telecommunications, 2003, 88 pages.
Bluetooth, "Specification of the Bluetooth System", Covered Core Package version: 4.0, Jun. 30, 2010, vol. (0-6), pp. 1-2302.

* cited by examiner

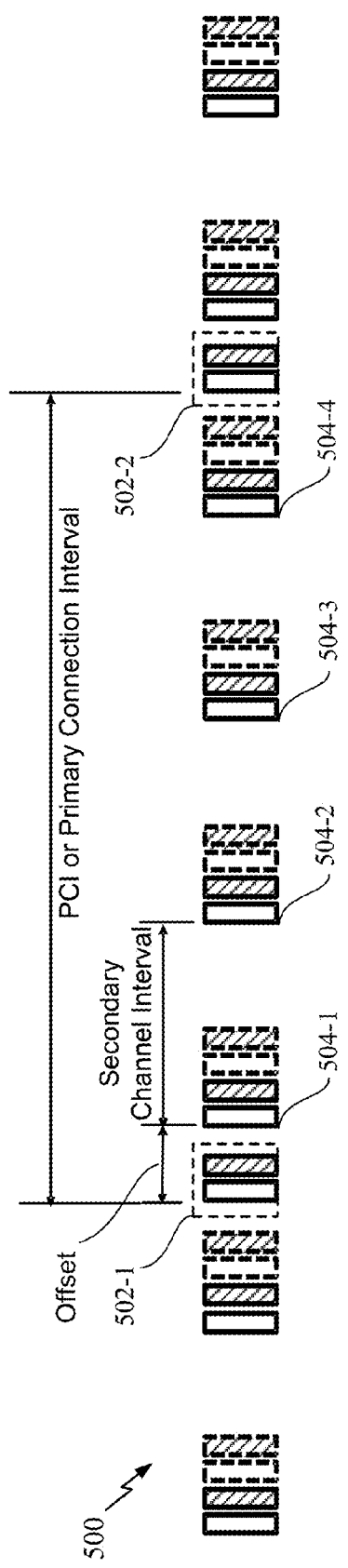

BLUETOOTH LOW ENERGY SECONDARY DATA CHANNEL WITH MULTI-RATE STREAMING

CROSS-REFERENCE TO RELATED APPLICATIONS

The present Application for Patent claims the benefit of U.S. Provisional Application No. 61/926,994, entitled "BLUETOOTH LOW ENERGY SECONDARY DATA CHANNEL WITH MULTI-RATE STREAMING," filed Jan. 14, 2014, assigned to the assignee hereof, and expressly incorporated herein by reference in its entirety.

FIELD OF DISCLOSURE

This disclosure relates generally to wireless systems and, more particularly, to low energy, short range wireless streaming

BACKGROUND

Bluetooth (BT) is a short-range wireless communication protocol, for mobile phones, computers, digital cameras, wireless headsets, speakers, keyboards, mice or other input peripherals, and similar devices. BT supports a personal area network (PAN) between a master and a plurality slaves.

For quality of transmission over BT, for example, for voice traffic, a synchronous connection-oriented (SCO) link or extended SCO (eSCO) link may be employed. To guarantee adequate bandwidth, an SCO or eSCO link reserves specific time slots as dedicated to the eSCO or SCO traffic. As a result, other wireless communication can be relegated to asynchronous "unreserved" time slots, e.g., Asynchronous Connection Oriented Channels (ACL) in a similar manner as WLAN. WLAN may be relegated to the unreserved time slots during SCO or eSCO operation, which may prevent proper operation of WLAN.

BT, however, can have power consumption higher than desired for certain low power applications. A variation, termed Bluetooth Low Energy or "BTLE" was developed, which has proved useful for many application, enabling new applications that were not practical with Classic Bluetooth technology. For example, BTLE is used in coin cell battery-operated sensors and actuators in medical, industrial, consumer, and fitness applications (also known as "Smart") can now smoothly connect to BTLE enabled smart phones, tablets, and the like (also known as "Smart Ready").

Conventional BTLE can be particularly useful for applications requiring episodic or periodic transfer of small amounts of data.

Many features of Classic Bluetooth technology are inherited in BTLE, such as adaptive frequency hopping (AFH) as well as part of the logical link control and adaptation protocol (L2CAP) interface, and certain security aspects such as simple pairing modes, secure authentication, and encryption.

However, BTLE did not inherit BT Synchronous Connections (SCO) or extended Synchronous Connections eSCO. This can render BTLE impractical or not preferred for certain streaming applications, for example, audio streaming. Such impracticality can result from BTLE being originally designed to carry small data packets. However, typical BTLE "on-air" is a fractional time resource, as many such devices are often kept in a "sleep" mode.

One partial solution is a "dual mode" device, switchable between Classic BT and BTLE. However, dual mode BTLE devices have various shortcomings. For example, valuable chip area can be taken, and power loss can arise from supporting two technologies.

Therefore, a need remains for low power BTLE benefits with BT streaming capability.

SUMMARY

Methods and systems according to various exemplary embodiments can provide, among other features and benefits, a secondary data channel concurrent with a conventional BTLE primary data channel, the secondary data channel having a rate readily configurable to integer multiples of the conventional BTLE data channel rate Operations in one method for wireless communicating can include receiving wireless packets at a first device, over a primary data channel, according to an interval, and receiving at the first device, over the primary data channel, a request from the second device, wherein the request from the second device is a request to establish a secondary data channel. The request to establish a secondary data channel may include secondary connection parameters including an offset and an interval. The offset may be relative to primary data channel events. The sub-interval may be relative to the interval. Operations can further include, in response to receiving the request from the second device, sending from the first device to the second device an acknowledgement message and receiving at the first device wireless packets from the second device, in response to the acknowledgement message, over the secondary data channel and in accordance with the secondary connection parameters.

Example operations in practices of another method for wireless communicating can include receiving packets, at a first device, wherein the packets are from a second device, wherein the packets are received over a primary data channel, and wherein the packets are received according to an interval. Example operations in such practices may further include sending from the first device to the second device, over the primary data channel, a request to establish a secondary data channel, wherein the request to establish a secondary data channel includes secondary connection parameters. Secondary connection parameters may include an offset and a sub-interval, wherein the offset may be relative to a packet event on the primary data channel, and the sub-interval may be relative to the interval. Example operations in such practices may further include receiving, at the first device, an acknowledgement message, the acknowledgement message being from the second device, and indicates the second device received the request to establish the secondary data channel. Operations in such practices can include sending packets over the secondary data channel, from the first device to the second device, in response to receiving the acknowledgement message, wherein the sending packets over the secondary data channel may be in accordance with the secondary connection parameters.

In an aspect, the sub-interval may be an integer submultiple of the interval, and sending packets over the secondary data channel may include the first device sending a first packet and the first device sending a second packet, wherein the first packet is spaced, by the offset, from the packet event on the primary data channel and wherein the second packet is spaced two of the sub-intervals from the packet event on the primary data channel.

Operations in example practices of another method for wireless communicating may include communicating packets between a first device and a second device, over a primary data channel, according to an interval, and the first device receiving, over the primary data channel, a request from the second device, wherein the request from the second device is to establish a secondary data channel. In an aspect, the request from the second device may include secondary connection parameters. The secondary connection parameters may include an offset and a sub-interval, wherein the offset may relative to a packet event on the primary data channel, and the sub-interval may be relative to the interval. Operations in example processes according to the method can include the first device sending the second device an acknowledgement message, wherein sending the second device an acknowledgement message may be in response to receiving the request from the second device and, in response to receiving the acknowledgement message, the second device sending secondary data channel packets to the first device, wherein sending secondary data channel packets to the first device is in accordance with the secondary connection parameters.

One example system for wireless communicating may include means for communicating packets between a first device and a second device, over a primary data channel, according to an interval, means for receiving at the first device, over the primary data channel from the second device, a request to establish a secondary data channel. The request to establish the secondary data channel may include secondary connection parameters, which may include an offset and an interval. In an aspect, the offset may be relative to events on the primary data channel, and the sub-interval relative to the interval. One example system may include means for sending from the first device to the second device, in response to the request from the second device, an acknowledgement message, means for sending packets, from the second device to the first device, in response to receiving the acknowledgement message. The sending packets may be in accordance with the secondary connection parameters.

BRIEF DESCRIPTION OF THE DRAWINGS

The accompanying drawings are presented to aid in the description of aspects disclosed and are provided solely for illustration of the aspects and not any limitation thereof.

FIG. 5 shows one example S-BTLE data channel timing, carrying a primary data channel according to conventional BTLE timing and, concurrently, one S-BTLE secondary data channel, with an example offset.

DETAILED DESCRIPTION

Aspects of the invention are disclosed in the following description and related drawings directed to specific aspects disclosed. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment or aspect described herein as "exemplary" is not necessarily to be construed as preferred or advantageous over other aspects. Likewise, the term "aspect disclosed" does not require that all aspects disclosed include the discussed feature, advantage or mode of operation. It will therefore be appreciated that the terminology used herein is for the purpose of describing particular aspects only and is not intended to be limiting of various aspects of the invention.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It will be understood that designation of elements as "first," "second," and so forth does not, unless explicitly stated or made clear from a particular context, limit the quantity or order (temporal or spatial) of those elements. For example, a reference to first and second elements does not mean that only two of the described elements may be employed, and does not mean that the first element must precede the second element in order of time, spatial position, or importance.

Except where stated otherwise, recitation of a "set of elements" means the set comprise one or more elements. In addition, unless stated otherwise phraseology of the form "at least one of X, Y, or Z" or "one or more of X, Y, or Y" or "at least one of the group consisting of X, Y, and Y," whether in the description or claims, are interchangeable and synonymous and mean "X or Y or Z, or X and Y, or X and Z, or X and Y and Z or any combination of these elements."

Figure 1:
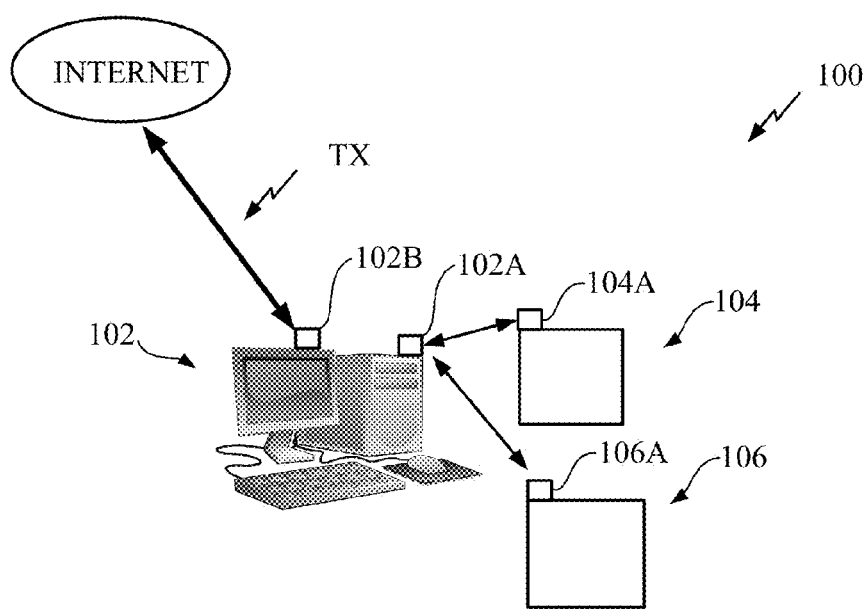
FIG. 1 shows one example system having Bluetooth LE (BTLE) connections between examples of BTLE enabled devices.

FIG. 1 shows one example BTLE system 100 having connections between various examples of BTLE enabled devices. Referring to FIG. 1, BTLE system 100 can include a Bluetooth LE (BTLE) enabled personal computing device 102 and, for purposes of illustration, can include a low-complexity, limited function BTLE enabled device 104. The low-complexity, limited function BTLE enabled device 104 can be, for example, without limitation, a heart monitor (not specifically shown in FIG. 1) or an air quality sensor (not specifically shown in FIG. 1). Example BTLE enabled personal computing devices 102 can include, without limitation, one or more among a desktop computer, a laptop computer, notebook computer, tablet computer, or other portable computing device, e.g., a cellular smart phone, or any other programmable digital computing device having a digital processor (not explicitly shown in FIG. 1) connected, for example, by a bus to a memory (not explicitly shown in FIG. 1) storing instructions that, when executed by the digital processor, cause it to perform one or more methods according to the embodiments described herein. The BTLE enabled personal computing device 102 can include a BTLE interface module 102A such as, but not limited to, an example described in further detail later in this disclosure. The BTLE enabled personal computing device 102 may include, in an aspect, a user interface (not explicitly shown), for example, a keyboard, touch screen and/or infrared (IR) interface. The BTLE enabled personal computing device 102, in an aspect, can include an Internet interface module 102B that interfaces a generic multilayer link LX to the Internet, for example, through a WiFi station or wireless router to an Internet Service Provider (ISP). The physical layer (not explicitly shown) of the multilayer link LX can include DSL, satellite, and/or optical fiber.

As described previously in this disclosure, the BTLE system 100 can also include a low-complexity, limited function BTLE enabled device 104, for example, without limitation, a heart monitor or air quality sensor. In this context, "limited" means a narrow scope of functions or purposes. For brevity, the limited function BTLE enabled device 104 will hereinafter be referenced, alternatively, as the "BTLE enabled peripheral device 104." The BTLE enabled peripheral device 104 can have a BTLE interface/control module 104A, which can be according to examples described in greater detail later in this disclosure. It will be understood that the BTLE enabled peripheral device 104 is not necessarily implemented as or by a dedicated hardware device, or by a simple device. On the contrary, in an aspect, the FIG. 1 BTLE enabled peripheral device 104 may be implemented by, or on, a device according to the BTLE device 200, or a reduced version of the BTLE device 200, as described in greater detail later in this disclosure. In addition, embodiments can be implemented by two or more BTLE enabled personal computing devices 102.

Referring to FIG. 1, the BTLE system 100 can also include a higher functionality configurable BTLE enabled device 106 having, for example, a BTLE configurable interface 106A. The term "configurable" can mean a plurality of aspects or modes that are user controllable, as opposed to simple controls, such as scheduling sensor operation or setting of an alarm event. Illustrative configurable BTLE enabled devices 106 include, but are not limited to, headphones (not specifically shown in FIG. 1), or other audio playback device, as well as a hearing aid (not specifically shown in FIG. 1) or other real-time audio enhancement device. The configurable BTLE enabled device 106 may include digital processing resources (not separately shown), for example, a user-configurable audio codec or noise-canceling module.

Figure 2:
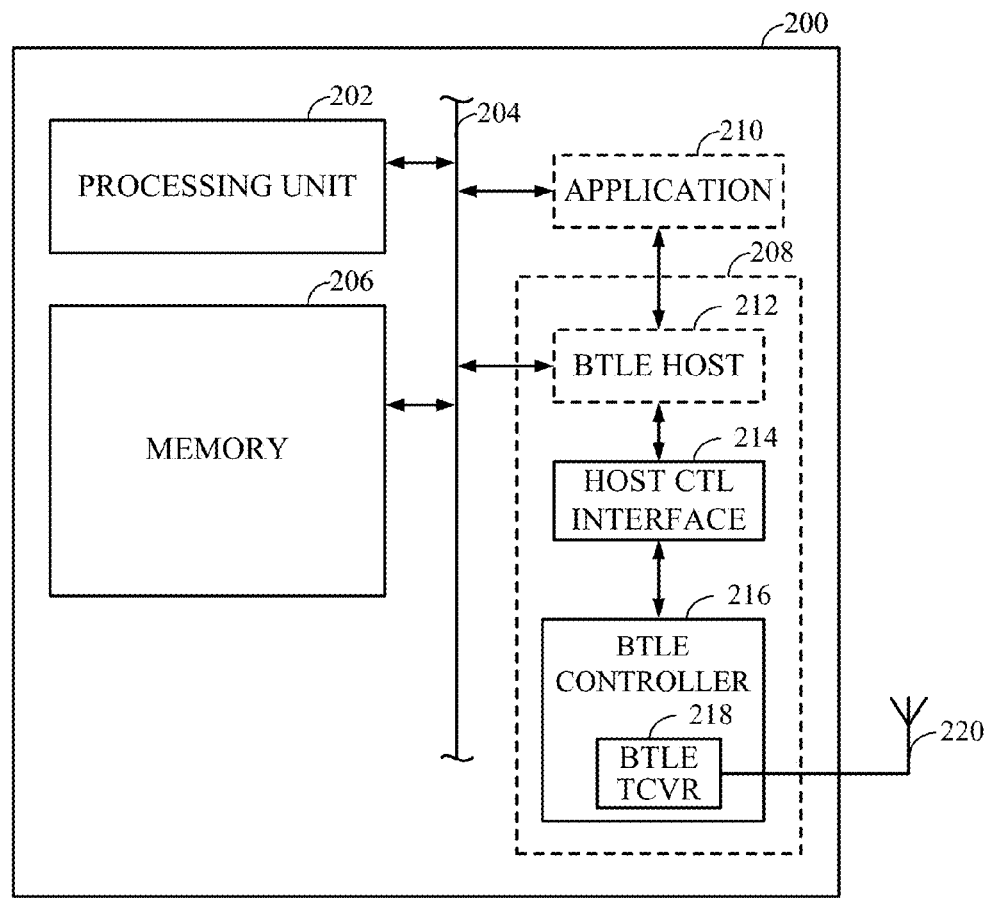
FIG. 2 shows a functional block schematic of one BTLE enabled device.

FIG. 2 shows a functional block schematic 200 of a BTLE enabled device that may implement, for example, the BTLE enabled central device 102 showing in FIG. 1. For brevity in the description that follows, the phrase "BTLE device" 200 will be understood to mean "a BTLE-enabled device including capability and functionality that is either according to, or representable by, the functional block schematic 200."

Referring to FIG. 2, the BTLE enabled device 200 can include a processing unit 202 coupled by a bus 204 to a memory 206. In an aspect, the BTLE enabled device 200 can include a BTLE protocol stack 208 such as described in the Bluetooth Core Specification, Version 4.0 protocol specification, which may run under, for example, a higher level application 210, hereinafter referred to as "application" 210.

The BTLE protocol stack 208 can include a BTLE host 212, a BTLE host controller interface 214, and a BTLE controller 216. The BTLE controller 216 can include a BTLE transceiver 218 coupled to a BTLE antenna 220. The application 210, although shown as a single block within the BTLE enabled device 200, may be a distributed function, implemented by, for example, resources of the processing unit 202 in combination with processor-executable instructions (not separately shown) stored in the memory 206. In an aspect, the BTLE host 212 of the BTLE protocol stack 208 may be implemented, at least in part, by the processing unit 202 in combination with processor-executable instructions (not separately shown) stored, for example, in the memory 206. It will be understood that the single block graphical representation of the memory 206 is not intended to limit or define any structural feature of the memory 206. For example, the block shown as "memory" 206 can represent distributed memory capabilities and resources.

Figure 3:
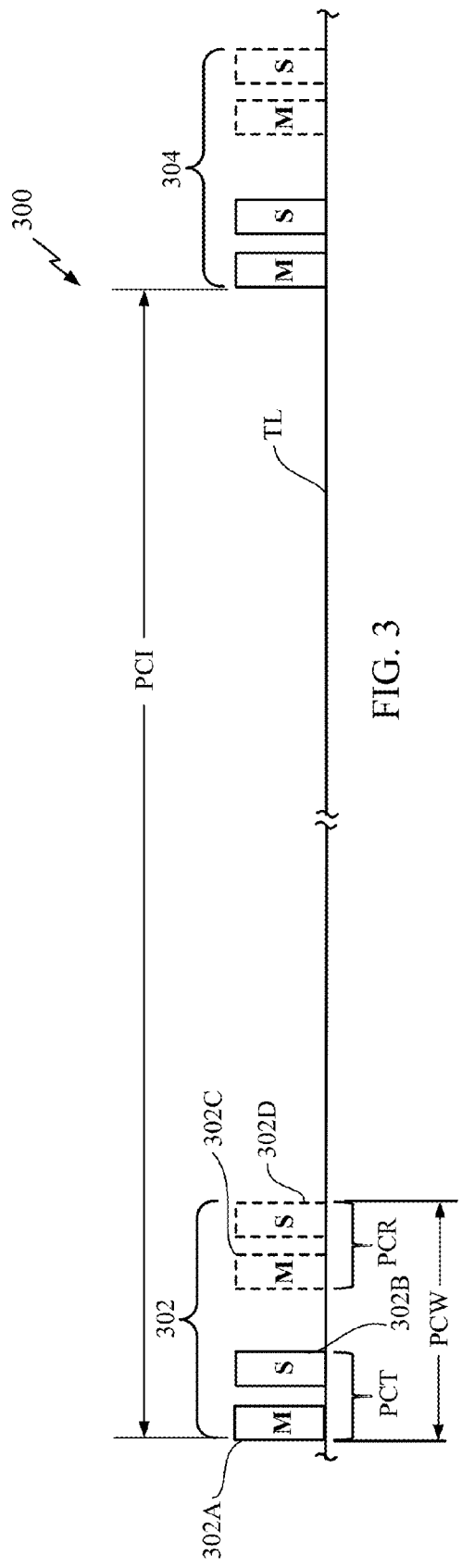
FIG. 3 shows one example primary connection timing according to conventional BTLE techniques.

FIG. 3 depicts one connection timing 300 according to conventional BTLE protocol connection. Referring to FIG. 1, the connection timing 300 shows a primary channel event 302, which comprises at least a primary channel transmission ("PCT") which includes a master-to-slave packet transmission 302A, from a BTLE enabled master to a BTLE enabled slave and (assuming it is received and the BTLE enabled slave is operational), a reply, as a slave-to-master packet transmission 302B. In accordance with BTLE standards, if the master device does not receive, or detects error in the slave-to-master packet transmission 302B (e.g., it was not transmitted or was corrupted) the primary channel event 302 also includes a primary channel retransmission ("PCR"). Referring to FIG. 3, the transmissions within the primary channel retransmission PCR, being conditional, are depicted in dotted lines. The primary channel retransmission PCR includes a master-to-slave packet retransmission 302C, from the BTLE enabled master to the BTLE enabled slave and (assuming it is received and the BTLE enabled save is operational) a reply in the form of the slave-to-master packet retransmission 302D. It will be understood that the labels "PCT" and "PCR" are arbitrarily selected and have no intrinsic meaning. The primary channel retransmission PCR can be according to conventional BTLE techniques. Such conventional BTLE techniques are known to persons of ordinary skill, and therefore further detailed description is omitted.

Regarding the time required for the primary channel event 302, to allow for the primary channel retransmission PCR, a time width, labeled "PCW" can be allotted for the primary channel event 302, where PCW is sufficient for the primary channel retransmission PCR. Separated in time from the start of the primary channel event 302 by a span that may be termed a "primary channel interval" or "PCI" is the next primary channel event 304. Although FIG. 3 does not necessarily present PCI and PCW drawn to scale, it represents graphically that PCI is typically much longer than PCW. In other words, the numerical difference between PCW and PCI is significant. In conventional BTLE this time is not available for usable master-slave connections. This can be a significant loss in time-bandwidth resources.

Methods and systems according to various exemplary embodiments can provide novel, dynamically adaptable and reconfigurable assignment of the above-identified difference between PCW and PCI. Methods and systems can provide, among other features and benefits, multi-channel, and multi-rate configurability of the BTLE link layer. As will be appreciated by persons of ordinary skill upon reading this disclosure, exemplary embodiments can enable significant movement toward a maximum utilization of bandwidth, with lower bandwidth cost than conventional BTLE physical layer techniques.

In an aspect, methods and systems can provide a first or primary BTLE channel that meets conventional BTLE specifications and, concurrently, can provide one or more secondary data channels that can effectively superpose on and synchronize to—but not interfere with—the primary BTLE channel. As can be readily understood by persons of ordinary skill upon reading this disclosure, this aspect is a novel and significant advance over conventional BTLE.

For convenience in describing example methods, systems and processes, the term "supplemented BTLE" or "S-BTLE" will be used as a name for the protocol according to the various exemplary embodiments, providing, among other features and benefits, a primary BTLE channel according to conventional BTLE specifications and, concurrently, one or more secondary data channels superposed on and synchronized to—but not interfering with—the primary BTLE channel. It will be understood that the names "supplemented BTLE" and "S-BTLE" are only labels, and carry no descriptive meaning.

Operations in practices of one example S-BTLE method for wireless communicating may include receiving wireless packets at a first device, over a primary data channel, according to an interval. The primary data channel may be a conventional BTLE data channel, and the interval may be the primary connection interval PCI described in reference to FIG. 3. The first device may be a BTLE enabled computing device, such as the BTLE enabled computing device 102 of FIG. 1. Continuing with operations in practices of one example S-BTLE method, the operations may include receiving at the first device, over the primary data channel, a request from the second device, the request being a request to establish a secondary data channel. The request to establish a secondary data channel may include secondary connection parameters. The secondary connection parameters may include an offset and a sub-interval. In an aspect, the offset is relative to an event on the primary data channel, for example, the start of the primary data channel event 302 described in reference to FIG. 3. The sub-interval may be an integer submultiple of the interval. Operations in practices of one example S-BTLE method can include, in response to receiving the request from the second device, sending from the first device to the second device an acknowledgement message. Continuing, operations in practices of one example S-BTLE method can include receiving wireless packets at the first device. The receiving wireless packets can be over the secondary data channel, in accordance with the secondary connection parameters.

Examples will be described in reference to FIG. 4 and other figures that are part of this disclosure.

One general feature of S-BTLE in accordance with various exemplary embodiments can be understood by description of one example. One example will assume a primary BTLE channel has been established between a BTLE enabled device operating as a master device (e.g., the FIG. 1 example BTLE enabled personal computing device 102) and a BTLE device operating as a slave device (e.g., the FIG. 1 BTLE enabled peripheral device 104). As one specific example, the slave device will be assumed to be a BTLE enabled heart monitor. The interval of the established primary BTLE channel interval can be assumed, as an arbitrary value, to be a 24-unit interval. For purposes of illustrating concepts, the absolute time span of the "unit" (e.g., number of millisecond) of the unit is irrelevant. The example of 24 units is selected because, for reasons that will be apparent to persons of ordinary skill upon reading this entire disclosure, aspects can benefit from intervals having several integer submultiples.

Continuing with description of the above example, in an aspect, the master device can send the slave device, over the primary BTLE channel, a request—in accordance with various exemplary embodiments—to establish a secondary BTLE channel. In a further aspect, the request can be carried by a packet that can be configured to fit conventional BTLE protocol, modified to carry information particular to the practices of exemplary embodiments. The modification can be, for example, modifying and/or extending the conventional BTLE protocol fields. Examples are described later in greater detail. The secondary data channel parameters can include, for example, an offset relative to the primary channel, and a secondary data channel interval. The secondary data channel interval may be referred to, alternatively, as a "sub-interval." In an aspect, the secondary data channel interval, or sub-interval, can be an integer submultiple of the primary channel interval. One arbitrary example secondary data channel interval may be 3. The value 3 is an integer submultiple of 24, as it divides 8 times.

The slave device can, for example, use software instructions that when executed by a slave device processor configure its BTLE interface, according to the exemplary embodiments, to send (and receive, assuming duplex operation) 8 evenly-timed secondary data channel events for every BTLE channel event. Each secondary data channel event may comprise transmission of a packet from the master device to the slave device and transmission of a response packet from the slave device to the master device and, if necessary, a retransmission. The slave device can also configure the sending of S-BTLE secondary data channel events such that the first (after the BTLE primary channel event) is delayed from that BTLE channel event by the offset. The slave device can send the master device a receipt-of-message acknowledgement. In an aspect, the master device (e.g., a BTLE enabled heart rate monitor) can then begin streaming data, re-synchronized every 8 events (secondary data channel events) by another primary BTLE event, at 8 times the primary BTLE channel rate. Examples of this messaging are described in greater detail in reference to FIG. 9. Examples of a slave-initiated request to establish a secondary data channel are described in greater detail in reference to FIG. 10.

It will be understood that the above-described example value of 24 for the primary channel interval, and the example value of 3 for the secondary data channel interval are arbitrary, and non-limiting. As illustration, using the same primary channel interval of 24, a secondary data channel interval of 1, 2, 4, 6, 8 or 12 could be selected, with 1 providing the highest secondary data channel rate and 12 the lowest secondary data channel rate. In a further aspect, examples of which are described in greater detail later in this disclosure, the master-slave messaging described above can establish multiple secondary data channels. In addition, the master-slave messaging described above can be configured to establish multiple secondary data channels with the same secondary data channel rate, or with different secondary data channel rates.

Continuing with description of the example in which a secondary data channel, having a rate 8 times faster than the primary BTLE is established, in an aspect, instead of assigning a single secondary data channel with interval ⅛ of the unit interval, two secondary data channels can be established having respective intervals, for example of ¼. In an aspect, the two secondary data channels can be assigned respective intervals, relative to the primary BTLE channel, such that there is no overlap.

In another example, illustrative of example aspects of one or more exemplary embodiments, methods and systems can provide, concurrent with the first or primary BTLE channel in accordance with conventional BTLE specifications, two or more concurrent secondary data channels. In addition to providing two or more concurrent secondary data channels, also concurrent with and superposed with the primary BTLE channel, methods and systems can provide different ones of the secondary data channel that, viewed in time, can superpose over—but not interfere with—the primary BTLE channel.

Figure 4:
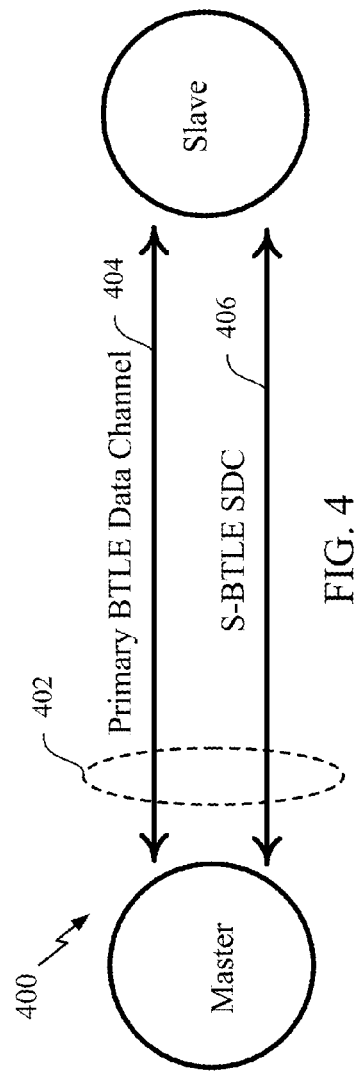
FIG. 4 shows one high-level connection diagram, between a master device and a slave device, with a primary BTLE data channel according to conventional BTLE protocol, concurrent with one supplemented BTLE (S-BTLE) secondary data channel.

FIG. 4 shows a high level connection diagram 400 of one example S-BTLE connection 402, between a master device and a slave device, including a primary BTLE data channel 404 according to conventional BTLE protocol, concurrent with one S-BTLE secondary data channel 406.

FIG. 5 shows one calculated S-BTLE channel timing 500, for example, for the FIG. 4 S-BTLE connection 402. Referring to FIG. 5, the calculated S-BTLE channel timing 500 shows example BTLE primary data channel events labeled 502-1 and 502-2, separated by the primary channel interval PCI. The BTLE primary data channel events 502-1 and 502-2 may include primary channel retransmission. However, to focus on aspects particular to the embodiments, primary channel retransmission is not visible in FIG. 5. Referring to FIG. 5, the first secondary data channel event, 504-1, after the primary channel event 502-1 is delayed by the offset, followed by a next secondary data channel event 504-2 spaced in time by the secondary data channel interval SCI. As seen from FIG. 5, the example SCI value for the secondary data channel, in terms of being a submultiple of the primary channel interval PCI, is 4. It will be understood that the first secondary data channel event, 504-1, may be termed a "secondary data channel first packet" 504-1, and second secondary data channel event, 504-2, may be termed a "secondary data channel second packet" 504-2.

In an aspect, each S-BTLE SDC event can be encrypted, using an encryption unique from the primary BTLE data channel, but configurable to encrypt using the same encryption key as the primary BTLE data channel. Further to this aspect, methods and systems according to exemplary embodiments can provide each S-BTLE SDC event with a nonce that is unique per secondary channel. In an aspect, a nonce initialization can be performed during the message exchange in establishing a new S-BTLE secondary data channel. The initialization vector (IV) exchanged at setup in accordance with exemplary embodiments is therefore different from the IV exchanged during conventional BTLE setup. It will appreciated by persons of ordinary skill in the art, upon reading the present disclosure in its entirety, that more than one means may be employed, or adapted to exchange the IV.

In an aspect, a nonce counter (not explicitly shown) is provided, which can be configured to start at zero, and not start incrementing until the next expected sequence number (NESN) is changed by a remote device. In a further aspect, the nonce counter increments (decrements) at each S-BTLE SDC event. In an aspect, at the beginning of each S-BTLE SDC event, the sequence number (SN) increments and the nonce counter decrements. SN remains constant for the entire S-BTLE secondary data channel interval. For the master, the retransmission window can be used for master retransmission when the slave's NESN does not increment. The slave, in an aspect, can always listen for master retransmission.

As known to persons of skill in the pertinent art, conventional BTLE uses a 37-channel frequency hopping scheme. As also known to such persons, the number of channels is actually 40, but 3 are generally reserved for advertisement. In an aspect, S-BTLE provided by and embodied in systems and methods according to exemplary embodiments can include a frequency hopping for the secondary data channels. Further to this aspect, the hopping can be a "merged hopping." In an aspect, the merged hopping can be computed according to an algorithm that is based, in part, on the hopping interval assigned to the primary BTLE, and a channel-specific additional hopping interval, termed "hopIncrementSCD." It will be understood that the name "hopIncrementSCD" is arbitrarily selected and has no intrinsic value.

As known by persons of ordinary skill in the art, one "normal" BTLE hopping algorithm can be $$C_n = (C_{n-1} + \text{hopIncrement}) \bmod 37, \quad \text{(Eq. 1)}$$

where Cn is the channel (i.e., frequency) to which the nth primary BTLE channel event is assigned.

Figure 6:
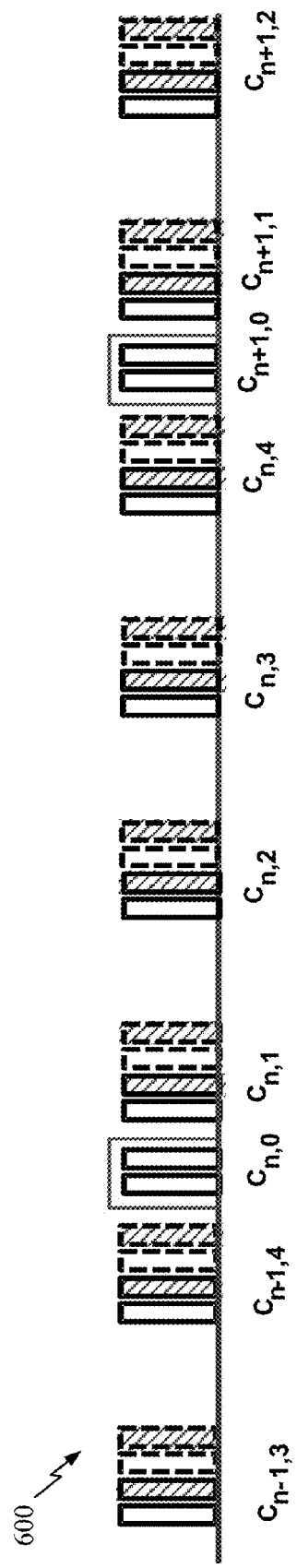
FIG. 6 is an annotation of the FIG. 4 example S-BTLE secondary data channel timing for convenience in describing an aspect of S-BTLE hopping.

FIG. 6 is an annotation of the FIG. 5 example S-BTLE channel timing for convenience in describing an aspect of S-BTLE merged hopping. The BTLE primary data channel events described in reference to FIG. 6 may include primary channel retransmission. However, to focus on aspects particular to the embodiments, primary data channel retransmission is not visible on FIG. 6.

In overview, the S-BTLE merged hopping algorithm can increment at each successive channel event, regardless of the event being a primary BTLE data channel event or an S-BTLE secondary data channel event. In an aspect, the S-BTLE merged hopping algorithm can be according to Eq. 2:

$$C_{n,i}(C_{n-1,0} + \text{hopIncrement} + (i*\text{hopIncrementSCD})) \bmod 37 \quad \text{(Eq. 2)}$$

where "n" is the primary BTLE data channel event index and "i" is incremented at each data channel event, regardless of it being the primary BTLE data channel event or an S-BTLE secondary data channel event. Therefore, referring to Eq. 2, the S-BTLE merged hopping algorithm does not affect the "normal" mod 37 hopping value, because "i" rolls over to 0 at its first increment after the last S-BTLE secondary data channel event, which is a primary BTLE data channel event. In other words, the primary BTLE data channel event that increments "n" also increments "i," which rolls "i" over to 0.

Referring to FIG. 6, an example operation of the Eq. 2 S-BTLE merged hopping algorithm will be described, starting at the primary BTLE data channel event corresponding to channel index $C_{n,0}$. The value of the channel index $C_{n,0}$ is the value at $C_{n-1,0}$, added to the hopIncrement, and divided mod 37. Eqns. 1 and 2 are the same at this event. The first S-BTLE secondary data channel event after the primary BTLE data channel event transmitted at channel $C_{n,0}$ is transmitted $$C_{n,1} = (C_{n,0} + \text{hopIncrement} + (\text{hopIncrementSCD})) \bmod 37 \quad \text{(Eq. 2A)},$$

where Eq. 2A is simply Eq. 2 with specific values plugged in.

The next, i.e., second S-BTLE secondary data channel event after the primary BTLE data channel event transmitted at channel $C_{n,0}$, is transmitted at channel $$C_{n,2}=(C_{n,1}+\text{hopIncrement}+(2*\text{hopIncrement}SCD)) \mod 37 \quad \text{(Eq. 2B)}.$$

The next, i.e., third S-BTLE secondary data channel event after the primary BTLE data channel event transmitted at channel $C_{n,0}$, is transmitted at channel $$C_{n,3}=(C_{n,2}+\text{hopIncrement}+(3*\text{hopIncrement}SCD)) \mod 37 \quad \text{(Eq. 2C)}.$$

Continuing, the next, i.e., fourth S-BTLE secondary data channel event after the primary BTLE data channel event transmitted at channel $C_{n,0}$, is transmitted at channel $$C_{n,4}=(C_{n,3}+\text{hopIncrement}+(4*\text{hopIncrement}SCD)) \mod 37 \quad \text{(Eq. 2D)}.$$

The next event after the S-BTLE data channel event transmitted at $C_{n,4}$, increments "n" to "n+1" and, even though being another primary BTLE data channel event, increments "i" to "0".

Figure 7:
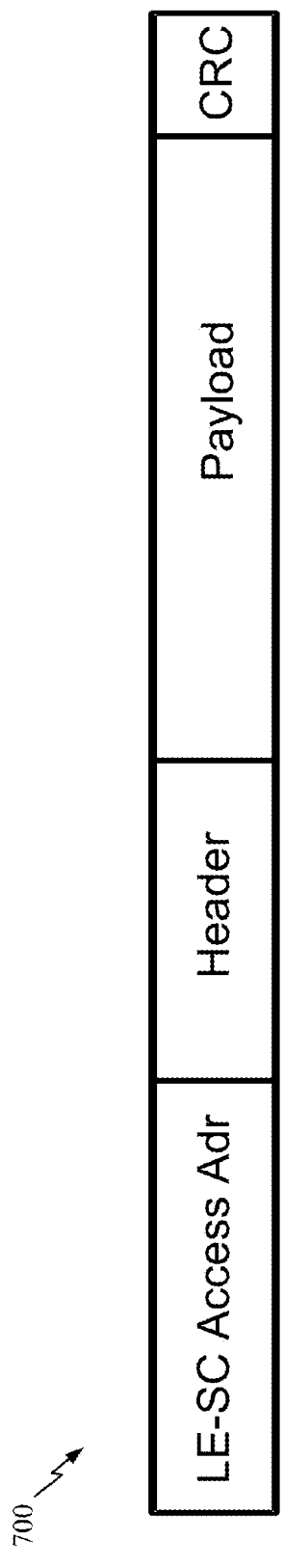
FIG. 7 shows one example packet structure exchanged in the messaging for setup of S-BTLE secondary data channels in accordance with exemplary embodiments.

FIG. 7 shows one example packet structure 700 for an example request message exchanged in the messaging for establishing one or more S-BTLE SDCs in methods and systems according to exemplary embodiments. In an aspect, the packet structure can be identical to conventional BTLE Data PDU format. Further to S-BTLE operation, the packet structure may have an SDC Access Address that is different from the primary data channel. The Header and CRC (and CRCInit) can be defined the same as LE Data PDU. The Payload can contain any information, e.g., and without limitation, monitor measurements or streaming audio.

Figure 8:
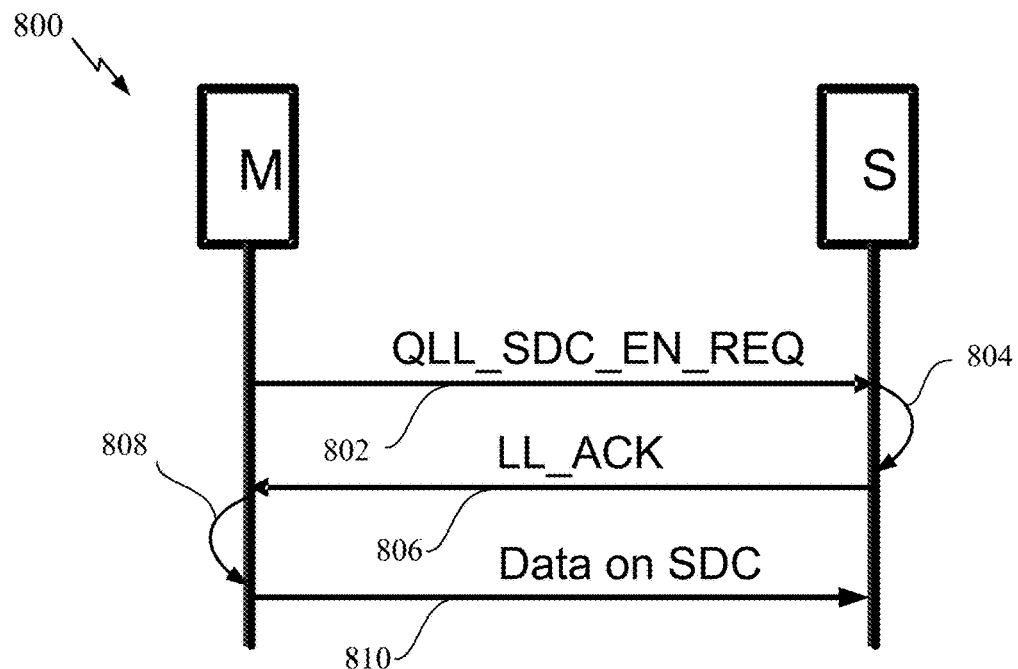
FIG. 8 shows a signaling flow diagram of one master device requested messaging over a conventional BTLE primary data channel, in an aspect of establishing one S-BTLE secondary data channel.

FIG. 8 is a signaling flow diagram 800, showing one master device requested messaging over a conventional BTLE primary data channel, in an aspect of establishing one S-BTLE secondary data channel. Referring to FIG. 8, at 802 the master device, for example the FIG. 1 personal computing device 102, a sends a request message to a slave device, for example the FIG. 1 heart monitor, or a microphone, to establish one or more S-BTLE secondary data channels.

As previously described in this disclosure, in an aspect, the request message sent at 802 is over an existing master-slave primary BTLE data channel. The request message may be labeled, for example, QLL_SDC_EN_REQ may include all of, or various sub-sets of the following S-BTLE SDC setup information. The example field lengths are for illustration only, and are not intended to limit the scope of any exemplary embodiments:

TABLE I

| Field | Example Length |
| --- | --- |
| AA | (4 octets) - can double as the handle |
| Connection Offset | (1 octet) |
| Connection Interval | (1 octet) |
| IV | (8 octets) |
| Hop Increment | (5 bits) |
| Sleep allowed | (1 bit) |
| 2 Mbps enabled | (1 bit) |

Referring to FIG. 8, in an aspect, the slave device at 804 receives the request message and, if decoding is successful, the slave device sends at 806 an acknowledgement, shown labeled "ACK," to the master device. At 808 the master device receives the ACK, and if receipt is valid, the master device starts sending data at 810 over the established S-BTLE SDC.

It will be understood that the messaging described in reference to FIG. 8 can be further to one or more methods according to various exemplary embodiments. For example, one such method can include receiving wireless packets at a first device, over a primary data channel, according to an interval. In one example, the described slave device can implement the first device, the Bluetooth BTLE primary channel can implement the data channel, and the master device can implement the second device. Example methods can further include the first device receiving a request from the second device, over the primary data channel. In an aspect the request can be a request to establish a secondary data channel, and the request can include secondary connection parameters. The secondary connection parameters can include an offset relative to the events on the primary data channel, and a sub-interval relative to the interval.

Referring to FIG. 8, one example of such a request can be provided by the described QLL_SDC_EN_REQ. Example methods can further include, in response to receiving the request from the second device, sending from the first device to the second device an acknowledgement message. Referring to FIG. 8, one example of sending such an acknowledgment message can be, or can include the slave device at 804 receiving the request message and, if decoding is successful, sending at 806 the ACK and, at 808, the master device receiving the ACK. Methods can further include receiving at the first device wireless packets from the second device, over the secondary data channel in accordance with the secondary connection parameters, in response to the second device receiving the acknowledgment message. Referring to FIG. 8, one example can include, if receipt of the ACK at 808 is valid, the master device sending data at 810 over the established S-BTLE SDC.

In another aspect, methods can employ the master device as the first device and the slave device as the second device. For example, methods can include receiving packets at a first device from a second device, over a primary data channel, according to an interval. Referring to FIGS. 1 and 8, the BTLE enabled peripheral device 104 can be a first device, and the BTLE enabled personal computing device 102 can be the second device. Methods can further include sending from the first device to the second device, over the primary data channel, a request to establish a secondary data channel. Referring to FIG. 8, one example of such a request can be the described QLL_SDC_EN_REQ sent at 802. In an aspect, the request can include secondary connection parameters including an offset relative to the primary data channel events (e.g., the primary data channel events 302 and 304 of FIG. 3), and a sub-interval relative to the interval. Referring to FIG. 8, such features can be provided by the described QLL_SDC_EN_REQ. Example methods can include receiving at the first device an acknowledgement message from the second device, indicating the second device receiving the request to establish a secondary data channel. Referring to FIG. 8, these features can be provided by the messaging at 806 and 808. In an aspect, methods can include sending, from the first device to the second device, in response to receiving the acknowledgement message, packets in accordance with the secondary connection parameters. Referring to FIG. 8, these features can be provided by the messaging at 810.

Figure 9:
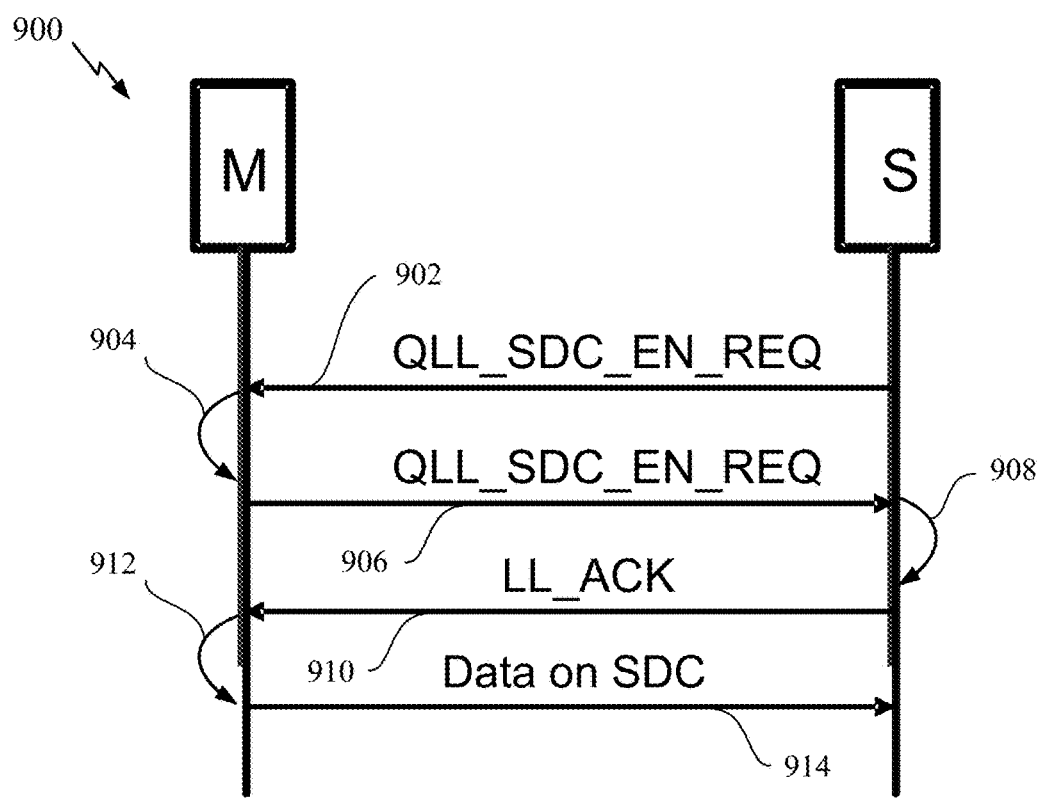
FIG. 9 shows a signaling flow diagram of one slave device requested messaging over a conventional BTLE primary data channel, in another aspect of establishing one S-BTLE secondary data channel.

FIG. 9 shows a signaling flow diagram of one master device requested messaging 900 over a conventional BTLE primary data channel, in another aspect of establishing one S-BTLE secondary data channel. Referring to FIG. 9, at 902 the slave device sends the master device, for example, a QLL_SDC_EN_REQ. The sending at 902 can be configured basically as a request for a request. The master device can receive the request at 904 and, if successful, can at 906 send back to the slave a request to establish an S-BTLE SDC. In an aspect, slave device at 908 receives the request message and, if decoding is successful, the slave device sends the master device, at 910, an acknowledgement labeled "ACK." At 912 master device receives the ACK, and if receipt is valid, the master device at 914 starts sending packets over the established S-BTLE SDC, to which the slave device can respond with data.

The functionality of the FIGS. 8 and 9 message exchanges may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module.

In addition, the components and functions represented by FIGS. 8 and 9 as well as other components and functions described herein, may be implemented using any suitable means. Such means also may be implemented, at least in part, using corresponding structure as taught herein.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect disclosed can include a computer readable media embodying a method for interference management by a Wi-Fi device. Accordingly, the invention is not limited to illustrated examples and any means for performing the functionality described herein are included in aspects disclosed.

While the foregoing disclosure shows illustrative aspects disclosed, it should be noted that various changes and modifications could be made herein without departing from the scope of the invention as defined by the appended claims. The functions, steps and/or actions of the method claims in accordance with the aspects described herein need not be performed in any particular order. Furthermore, although elements disclosed may be described or claimed in the singular, the plural is contemplated unless limitation to the singular is explicitly stated.

What is claimed is:

1. A method for wireless communicating, comprising:
receiving wireless packets at a first device, over a primary data channel of a Bluetooth Low Energy protocol connection, according to an interval that indicates a window to transmit data and a window to receive data;
receiving at the first device, over the primary data channel, a request to establish a secondary data channel, wherein the request to establish the secondary data channel is from a second device and includes secondary connection parameters, wherein the secondary connection parameters include an offset and a sub-interval, the offset is relative to an event on the primary data channel, the sub-interval is relative to the interval and shorter than the interval, and the event is one of the window to transmit data or the window to receive data;
in response to the request from the second device, sending from the first device to the second device an acknowledgement message; and
receiving wireless packets over a secondary data channel, at the first device from the second device, in response to the acknowledgement message and in accordance with the secondary connection parameters, wherein the secondary connection parameters further comprise a secondary hop value, and wherein receiving the wireless packets over the secondary data channel includes a secondary data channel hopping based on the secondary hop value that comprises generating a new channel number, wherein the generating the new channel number is configured to correspond to an $n^{th}$ repeat of the event on the primary data channel and to an event count, wherein the event count is incremented every event on the primary data channel and every secondary data channel event.

2. The method of claim 1, further comprising, prior to the first device receiving the request to establish the secondary data channel:
the first device sending to the second device, over the primary data channel, an earlier request to establish the secondary data channel, and
wherein the request to establish the secondary data channel is in response to the earlier request to establish the secondary data channel.

3. The method of claim 2, wherein the secondary data channel is a Bluetooth Low Energy protocol connection, and the sub-interval is a Bluetooth Low Energy protocol connection interval.

4. The method of claim 2, wherein, in receiving the wireless packets at the first device, over the primary data channel, the first device is a master device.

5. The method of claim 4, wherein the earlier request to establish the secondary data channel is a request for the request to establish the secondary data channel.

6. The method of claim 5, wherein receiving the wireless packets at the first device includes receiving wireless packets having a hopping according to a primary hop value, wherein receiving the wireless packets over the secondary data channel, at the first device from the second device, includes receiving the wireless packets that are secondary data channel hopping based on the primary hop value and the secondary hop value.

7. The method of claim 1, wherein the secondary data channel is a Bluetooth Low Energy protocol connection, and the sub-interval is a Bluetooth Low Energy protocol connection interval.

8. A method for wireless communicating, comprising:
receiving packets, at a first device, wherein the packets are from a second device and are received over a primary data channel of a Bluetooth Low Energy protocol connection according to an interval that indicates a window to transmit data and a window to receive data;
sending from the first device to the second device, over the primary data channel, a request to establish a secondary data channel, wherein the request to establish a secondary data channel includes secondary connection parameters, wherein the secondary connection parameters include an offset and a sub-interval, the offset is relative to a packet event on the primary data channel, the sub-interval is relative to the interval and shorter than the interval, and the packet event is one of the window to transmit data or the window to receive data;
receiving, at the first device, an acknowledgement message, wherein the acknowledgement message is from the second device, and wherein the acknowledgement message indicates the second device received the request to establish the secondary data channel; and
sending packets over the secondary data channel, from the first device to the second device, in response to receiving the acknowledgement message, wherein the sending packets over the secondary data channel is in accordance with the secondary connection parameters wherein the secondary connection parameters further comprise a secondary hop value, and wherein the first device sending packets to the second device over the secondary data channel includes a secondary data channel hopping based on the secondary hop value that comprises generating a new channel number, wherein the generating the new channel number is configured to correspond to an $n^{th}$ repeat of the packet event on the primary data channel and to an event count, wherein the event count is incremented every packet event on the primary data channel and every secondary data channel event.

9. The method of claim 8, wherein the secondary data channel is a Bluetooth Low Energy protocol connection, and the sub-interval is a Bluetooth Low Energy protocol connection interval.

10. The method of claim 8, wherein the sub-interval is an integer submultiple of the interval, wherein the sending packets over the secondary data channel includes the first device sending a first packet and the first device sending a second packet, wherein the first packet is spaced, by the offset, from the packet event on the primary data channel and wherein the second packet is spaced two of the sub-intervals from the packet event on the primary data channel.

11. The method of claim 8, wherein the primary data channel includes a channel hopping, wherein the channel hopping is according to a primary hop value, wherein the first device sending packets to the second device over the secondary data channel includes the secondary data channel hopping based on the primary hop value and the secondary hop value.

12. The method of claim 11, wherein the first device sending packets to the second device over the secondary data channel is according to secondary data channel events spaced by the sub-interval.

13. The method of claim 12, wherein the event count, when incremented at every packet event, rolls over to a zero value.

14. The method of claim 13, wherein the generating the new channel number includes multiplying the event count by the secondary hop value to obtain a product, adding the product to the primary hop value to obtain a sum, and generating the new channel number as a modulo 37 division of the sum.

15. The method of claim 8 wherein the packets received at the first device from the second device over the primary data channel include an encryption according to a key, and wherein the method further comprises the first device encrypting packets to generate encrypted packets, and wherein the sending packets over the secondary data channel includes sending the encrypted packets, wherein the first device encrypting packets includes using the key and includes incrementing a nonce.

16. A method for wireless communicating, comprising:
communicating packets between a first device and a second device, over a primary data channel of a Bluetooth Low Energy protocol connection, according to an interval that indicates a window to transmit data and a window to receive data;
the first device receiving, over the primary data channel, a request from the second device, wherein the request from the second device is to establish a secondary data channel, wherein the request from the second device includes secondary connection parameters, wherein the secondary connection parameters include an offset and a sub-interval, the offset is relative to a packet event on the primary data channel, the sub-interval is relative to the interval and shorter than the interval, and the packet event is one of the window to transmit data or the window to receive data;
the first device sending the second device an acknowledgement message, wherein sending the second device an acknowledgement message is in response to receiving the request from the second device; and in response to receiving the acknowledgement message, the second device sending packets over the secondary data channel to the first device, wherein the sending the packets over the secondary data channel to the first device is in accordance with the secondary connection parameters, wherein the secondary connection parameters further comprise a secondary hop value, and wherein the second device sending packets to the first device over the secondary data channel includes a secondary data channel hopping based on the secondary hop value that comprises generating a new channel number, wherein the generating the new channel number is configured to correspond to an $n^{th}$ repeat of the packet event on the primary data channel and to an event count, wherein the event count is incremented every packet event on the primary data channel and every secondary data channel event.

17. The method of claim 16, wherein the sub-interval is an integer submultiple of the interval, wherein the sending packets, over the secondary data channel, from the first device to the second device includes sending a secondary data channel first packet and sending a secondary data channel second packet, wherein the secondary data channel first packet is spaced by the offset from the packet event on the primary data channel, and wherein the secondary data channel second packet is spaced two sub-intervals from the packet event on the primary data channel.

18. The method of claim 16, wherein the primary data channel includes a channel hopping according to a primary hop value, wherein the second device communicating with the first device over the secondary data channel includes the secondary data channel hopping based on the primary hop value and the secondary hop value.

19. The method of claim 18, wherein the packet event on the primary data channel repeats according to the interval, wherein the sending the packets over the secondary data channel to the first device comprises transmissions having starts, wherein the starts are secondary data channel events.

20. The method of claim 19, wherein the event count, when incremented at every packet event, rolls over to a zero value.

21. The method of claim 20, wherein the generating the new channel number includes multiplying the event count by the secondary hop value to obtain a product, adding the product to the primary hop value to obtain a sum, and generating the new channel number as a modulo 37 division of the sum.

22. The method of claim 16, further comprising, prior to the first device receiving the request from the second device to establish the secondary data channel:
the first device sending to the second device over the primary data channel, an earlier request to establish a secondary data channel; and
the second device sending to the first device, over the primary data channel, the request received by the first device, in response to receiving the earlier request to establish a secondary data channel.

23. The method of claim 16, wherein the communication over the primary data channel includes an encryption according to a key, and wherein the method further comprises the second device encrypting secondary data channel packets, wherein encrypting the secondary data channel packets uses the key.

24. The method of claim 16, wherein the secondary data channel is a Bluetooth low energy channel.

25. The method of claim 16, wherein the secondary data channel is a first secondary data channel, wherein the acknowledgment message is a first acknowledgment, wherein secondary data channel parameters are first secondary data channel parameters, and wherein the request to establish the secondary data is a first request to establish a first secondary data channel, wherein the method further comprises:
the first device receiving, from the second device, a second request to establish a second secondary data channel, wherein the second request to establish the second secondary data channel has second secondary data channel connection parameters;
the first device sending the second device a second acknowledgement, wherein the first device sending the second device the second acknowledgement is in response to receiving the second request for establishing the secondary data channel; and
the second device sending second secondary data channel packets, wherein the second device sending the second secondary data channel packets is over the second secondary data channel, wherein the second device sending the second secondary data channel packets is in accordance with the second secondary data channel connection parameters.

26. A system for wireless communicating, comprising:
means for communicating packets between a first device and a second device, over a primary data channel of a Bluetooth Low Energy protocol connection, according to an interval that indicates a window to transmit data and a window to receive data;
means for receiving at the first device, over the primary data channel from the second device, a request to establish a secondary data channel of a Bluetooth Low Energy protocol connection, the request to establish the secondary data channel including secondary connection parameters, wherein the secondary connection parameters include an offset and a sub-interval, the offset is relative to a packet event on the primary data channel, the sub-interval is relative to the interval and shorter than the interval, and the packet event is one of the window to transmit data or the window to receive data;
means for sending from the first device to the second device, in response to the request from the second device, an acknowledgement message; and
means for sending packets, from the second device to the first device, in response to receiving the acknowledgement message, wherein the sending packets is in accordance with the secondary connection parameters, wherein the secondary connection parameters further comprise a secondary hop value, and wherein the sending packets over the secondary data channel includes a secondary data channel hopping based on the secondary hop value that comprises generating a new channel number, wherein the generating the new channel number is configured to correspond to an $n^{th}$ repeat of the packet event on the primary data channel and to an event count, wherein the event count is incremented every packet event on the primary data channel and every secondary data channel event.

27. The system of claim 26, wherein the sub-interval is an integer submultiple of the interval, wherein the sending the packets to the first device includes sending a secondary data channel first packet and sending a secondary data channel second packet, wherein the secondary data channel first packet is spaced by the offset from the packet event on the primary data channel, and wherein the means for the sending packets, from the second device to the first device, in response to receiving the acknowledgement message, is configured to send the secondary data channel second packet spaced two sub-intervals from the packet event on the primary data channel.

28. The system of claim 26, wherein the primary data channel includes a channel hopping according to a primary hop value, wherein the second device communicating with the first device over the secondary data channel includes the secondary data channel hopping based on the primary hop value and the secondary hop value.

29. The system of claim 26, wherein the packet event on the primary data channel repeats according to the interval, wherein the sending the packets to the first device comprises transmissions having starts, wherein the starts are secondary data channel events.

30. The system of claim 29, wherein the event count, when incremented at every packet event, rolls over to a zero value.

\* \* \* \* \*